United States Patent [19]

Halbfoster

[11] 4,238,334

[45] * Dec. 9, 1980

[54] PURIFICATION OF LIQUIDS WITH TREATED FILTER AID MATERIAL AND ACTIVE PARTICULATE MATERIAL

[75] Inventor: Christopher J. Halbfoster, Union, N.J.

[73] Assignee: Ecodyne Corporation, Chicago, Ill.

[ * ] Notice: The portion of the term of this patent subsequent to Dec. 4, 1996, has been disclaimed.

[21] Appl. No.: 76,065

[22] Filed: Sep. 17, 1979

Related U.S. Application Data

[63] Continuation-in-part of Ser. No. 836,967, Sep. 27, 1977, Pat. No. 4,177,142, which is a continuation-in-part of Ser. No. 457,821, Apr. 4, 1974, abandoned.

[51] Int. Cl.$^3$ ............................................. B01D 37/02
[52] U.S. Cl. .................................... 210/679; 210/504; 210/505; 210/508; 210/694; 210/777
[58] Field of Search .................. 210/24, 36, 37, 38 C, 210/75, 502, 503, 504, 505, 510, 508, 509; 252/426; 427/212, 221; 428/403, 404, 407

[56] References Cited

U.S. PATENT DOCUMENTS

| | | | |
|---|---|---|---|
| 3,242,073 | 3/1966 | Guebert | 210/50 |
| 3,250,702 | 5/1966 | Levendusky | 210/24 |
| 3,352,424 | 11/1967 | Guebert | 210/36 |
| 3,600,329 | 8/1971 | Enriquez | 252/426 |

OTHER PUBLICATIONS

Betz Handbook of Industrial Water Conditioning, 7th Edition, 1976, pp. 53-56.
Balthazar, J., "Belgian Experience with Powdered Resin Filter," Trib. Cebedeaux, Oct. 1969.
Balthazar, J. "Methodical Investigations of Continuous Condensate Purification with Powdered Resin Alluvial Filters," VGB Feed Water Convention 1971.
Balthazar, J. "Ion Purification of Condensates by Powdered Resin Filters," Laborelec, Report NI 1455.
Problems of Chemistry and Physics of Power Plants. The Performance and Possibilities of Application of Filters Utilizing Powdered Ion Exchange Resins, Aug. 27, 1968.

*Primary Examiner*—Ernest G. Therkorn
*Attorney, Agent, or Firm*—Hume, Clement, Brinks, Willian & Olds, Ltd.

[57] ABSTRACT

A method and filter bed for removing impurities from liquids wherein the filter bed comprises a mixture of treated filter aid material and an active particulate material having opposite surface charges in aqueous suspension. The filter aid material has been treated to produce the desired surface charge. The identity of the active particulate material depends on the application. Examples are organic polymeric absorbents, zeolites, bentonite, zirconium oxide, zirconium phosphate, activated alumina, ferrous sulfide, activated carbon and diatomaceous earth.

20 Claims, No Drawings

PURIFICATION OF LIQUIDS WITH TREATED FILTER AID MATERIAL AND ACTIVE PARTICULATE MATERIAL

This application is a continuation-in-part of my copending application Ser. No. 836,967, filed Sept. 27, 1977, now U.S. Pat. No. 4,177,142, which, in turn, is a continuation-in-part of application Ser. No. 457,821, filed Apr. 4, 1974, and now abandoned.

The present invention relates to an improved method for removing impurities from a liquid, and to an improved filter bed.

Copending application Ser. No. 836,967 describes and claims a method for removing impurities from a liquid, together with an improved filter bed, which employs a mixture of oppositely charged filter aid materials. These filter aid particles normally have a charge in aqueous suspension, and a portion of the particles is treated with a chemical compound to produce a surface charge which is opposite to the normal surface charge. A mixture of oppositely charged particles (normal charge and reverse charge) is produced, which results in a phenomenon known as "clumping" when the particles are mixed in aqueous suspension. The advantages of this clumping phenomenon are described in U.S. Pat. No. 3,250,702, which is assigned to the assignee of this application.

Generally, the present invention relates to an improvement upon the broader invention described and claimed in application Ser. No. 836,967, now U.S. Pat. No. 4,177,142 . It is generally known in the art that certain materials may be employed to remove either a narrow or a broad range of components from liquid streams through the phenomena of adsorption, absorption, or chemical reaction. For example, it is well known that activated carbon particles may be used to extract a broad range of components from liquids. Molecular sieves, such as zeolites, may also be used to extract components from liquids and may, in some instances, be designed to remove components of a very specific molecular size. Iron sulfide particles, on the other hand, have been employed to remove dissolved copper from liquid streams by reacting with the copper at the surface to form insoluble cupric sulfide. Various particulate materials may be used to extract undesired materials from water, such materials including carcinogens, pesticides, and other toxic wastes. These particulate materials, which may operate through the phenomena of adsorption, absorption, or chemical reaction, are referred to collectively herein as an "active particulate material." The foregoing are merely examples of such materials, and further examples are given herein.

It is well known that many active particulate materials, such as activated carbon, tend to form densely packed beds, particularly in their finely divided state where they are most efficient. It is therefore difficult to utilize such materials in performing the continuous filtration of liquid streams. However, in accordance with the present invention, it has been found that an active particulate component may be mixed with a treated fibrous filter aid material in order to "clump," producing a mixture which exhibits a reduced pressure drop as described in U.S. Pat. No. 3,250,702. Thus, whereas activated carbon, for example, has been principally used in a batch-type treatment of liquids wherein it is suspended and then filtered, the present invention enables the use of such materials in the treatment of a continuous stream. In addition, filter beds prepared in accordance with the present invention may be utilized as an overlay over other types of filter aid materials, or over ion exchange resins, such as described in copending application Ser. No. 836,967, copending application Ser. No. 844,319, or in U.S. Pat. No. 3,250,702, all of which are assigned to the assignee of this application.

Generally, the present invention relates to a method for removing impurities from a liquid, wherein the liquid is passed through a filter bed which comprises a mixture of treated fibrous filter aid material and an active particulate material, wherein the filter aid material comprises about 5 to 95%, on a dry weight basis, of the bed. The treated filter aid material and the active particulate material have opposite surface charges in aqueous suspension, and the mixture produces the aforementioned clumping phenomenon. The filter aid material has been treated with an electrolyte-type compound that produces a surface charge opposite to the normal surface charge of the filter aid material, by bonding to the surface thereof.

The invention also provides an improved filter bed which comprises a mixture of treated fibrous filter aid material and an active particulate material. Again, the treated filter aid material and the active particulate material have opposite surface charges in aqueous suspension, and the mixture produces a clumping phenomenon. The filter aid material comprises about 5 to 95%, by weight, of the bed, and the filter aid material has been treated with an electrolyte-type compound that produces a surface charge opposite to the normal surface charge by bonding to the surface thereof.

As used herein, the term "bed" refers to a layer, such as a precoat layer, which has been deposited on a filter screen, a wound annular filter cartridge, a film, a deep or shallow bed, or the like. Such a bed may advantageously be deposited on a tubular filter such as described in U.S. Pat. No. 3,279,608, which is assigned to the assignee of this application.

More specifically, it has been found that the "clumping" phenomenon described in U.S. Pat. No. 3,250,702, together with the advantageous reduced pressure drop and increased filtration efficiency of this phenomenon, can be employed to pass a liquid stream over an active particulate material.

It is well known that most particulate materials normally carry a surface charge in aqueous suspension. By the term "filter aid material," applicant refers to those materials which are conventionally deposited on a filter screen or the like in order to aid in the filtration which is produced by the filter. Most such materials are characterized by an electro-negatively charged surface.

The term "fibrous filter aid materials" refers to those having an elongated, fiber-like configuration. The dimensions of these fibers are not critical. However, it is often desirable to control the dimensions to facilitate precoating onto a filter element. In the case of cellulose, it is preferred that the fibers have a length of about 20 to 1000 microns, and more preferably in the range of 20 to 600 microns. The fiber length may be measured with a microscope having a calibrated, superimposed grid network.

Suitable fibrous filter aid materials which may be used in the present invention include cellulose fibers, polyacrylonitrile fibers, Teflon fibers, nylon fibers, rayon fibers, polypropylene fibers, and polyvinyl chloride fibers. While the particular identity of the fibrous material is not critical, it is important that it normally have a surface charge in aqueous suspension. The particularly preferred fibrous filter aid material for use in accordance with the present invention is cellulose fibers, which is available commercially under the trade name Solka-Floc.

A wide variety of chemical compounds may be employed in accordance with the present invention in order to produce a reversed surface charge on the fibrous filter aid material. Such compounds must have a plurality of charge sites so that a bond may be formed with the filter aid material and excess charge sites will remain to produce a surface charge which is the reverse of the normal surface charge.

When the filter aid material normally has an electronegatively charged surface, a cationic electrolyte-type compound is employed, preferably a cationic organic polyelectrolyte. These cationic compounds form an electrical bond with the surface of the negatively charged filter aid material, producing a positive charge on the surface thereof. Such polyelectrolytes are well known in the art, and include polyalkylene imines, polyalkylene polyamines, polyvinylbenzyl quaternary ammonium salts, polyvinylbenzyl tertiary amines, vinylbenzyl sulfonium polymers, etc. Specific polymeric compounds that could be employed include, for example, poly(1-butyl-4-vinyl pyridinium bromide), and poly(1,2-dimethyl-5-vinyl pyridinium metal sulfate). A particularly suitable cationic polyamine is one characterized by the repeating structure:

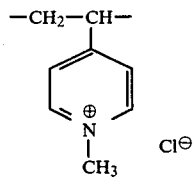

The application of chemical compounds to the filter aids in order to produce a reverse surface charge is normally carried out in aqueous suspension. In carrying out the preferred method, the filter aid material is simply suspended in water, and an adequate amount of chemical compound is added to produce the desired reverse surface charge. With high molecular weight polyelectrolytes (i.e., molecular weights in excess of 100,000), the point at which adequate polyelectrolyte has been added can be determined by observing the filter aid material as the polyelectrolyte is added. Initially, clumping will be produced as the surface charge of a portion of the fibers is reversed, and this clumping will then disappear when a reversal of substantially all of the surface charge is observed. However, with lower molecular weight polyelectrolytes, and even with some combinations of high molecular weight polyelectrolytes and filter aid material, no noticeable clumping is produced when the polyelectrolyte is added. In those instances, an adequate amount of polyelectrolyte must be determined from the results obtained when the treated fibers are mixed with the active particulate material. In general, at least about 5% of the chemical compound, based upon the weight of the dry filter aid particles, is required. However, much larger amounts can be employed, as there is no detriment realized from the use of an excess amount of the surface charge reversal-producing compound. Of course, the amount of compound required in a particular case depends upon many factors, including the nature of the fibers being treated and the number of positive or negative sites that are available on the chemical compound being added.

After the foregoing treatment has been completed, the filter aid material is normally de-watered and dried, and is then resuspended in water when it is desired to combine it with an active particulate material to form a filter bed.

In most instances, the fibrous filter aid material and the active particulate material will both normally have a negative surface charge in aqueous suspension. In those cases, the filter aid will be treated with a cationic electrolyte-type compound to produce a positive surface charge, as previously described.

In some instances, the filter aid material, the active particulate material, or both, may normally have a positive surface charge. Bearing in mind that the objective is to obtain an opposite charge between the fibrous filter aid material and the active particulate material, modifications of this treatment becomes necessary. Thus, where both the fibrous filter aid material and the active particulate material are positively charged, the filter aid material must be treated with an anionic electrolyte-type compound to produce an electro-negative surface charge. Suitable anionic compounds include polymeric acids such as polyacrylic acids, polysulphonic acids, etc. The method of treatment is the same as that described above in connection with the application of cationic materials.

In those instances where the fibrous filter aid material and the active particulate material normally have opposite surface charges in aqueous suspension, it is necessary to further treat the filter aid material with a second electrolyte-type compound to produce an enhanced surface charge which is the same as the normal surface charge. This enhanced charge is produced when the second electrolyte-type compound bonds to the treated filter aid material.

Thus, when the fibrous filter aid material normally has a negative surface charge in aqueous suspension, while the active particulate material has a postive charge, a "double treatment" of the filter aid material is employed to produce an enhanced electro-negative surface charge. To carry out this double treatment, the fibrous filter aid material is first treated with a cationic electrolyte-type compound as previously described to produce a positive charge. The treated filter aid material is then treated in the same manner with an anionic electrolyte-type compound to re-reverse the charge, producing an enhanced electronegative surface charge. Of course, in the opposite situation, where the filter aid material has a positive charge and the active particulate material has a negative charge, the "double treatment" would be reversed. That is, the filter aid material would be first treated with an anionic electrolyte-type compound and then with a cationic electrolyte-type compound to produce an enhanced electropositive surface charge.

As previously mentioned, a wide variety of active particulate materials may be utilized in accordance with the present invention. Examples include activated carbon, adsorptive clays such as bentonite; molecular sieves such as zeolite; zirconium oxides; zirconium phosphate; iron sulfide; and diatomaceous earth. Synthetic adsorbants may also be employed, such as those marketed by Rohm and Haas Co. under the trademark Amberlite XAD. Activated alumina may also be employed, although it should be borne in mind that, unlike the active particulate materials exemplified above, activated alumina has a positive surface charge in aqueous suspension.

The particle size of the active particulate material will depend upon the particular material being employed. For example, in the case of activated carbon, it is desirable to have very small particle size in order to maximize the surface area. When it is desired to maximize surface area, particles as small as one micron average particle size may be employed in accordance with the present invention. However, it should be understood that the present invention is operative with much larger particles, as large as 300 microns average particle diameter.

After this mixture of fibrous filter aid material and active particulate material has been prepared, it may be deposited on a filter element or other suitable support to form a bed. Alternatively, the mixture may be dewatered or dried and later resuspended prior to being deposited.

While the fibrous filter aid material may generally form as much as 95% or as little as 5% of the filter bed, on a dry weight basis, it is preferred that this material comprise from about 25% to about 60% of the bed. It should also be understood that, while the method and filter bed of the present invention will ordinarily employ a single fibrous filter aid material in combination with a single active particulate material, combinations of either or both materials may be employed in order to tailor the properties of the bed to a particular need.

The following examples are intended to illustrate the present invention, and should not be construed as limitative, the scope of the invention being determined by the appended claims.

In Examples I through V, the tests referred to were all conducted in a filter element having a single, tubular, stainless steel filter element having a layer of 8 mesh stainless steel screen covered by a layer of 50×250 mesh stainless steel screen, and having a surface area of 0.39 Ft.$^2$. The filter element was precoated with the precoat material being employed by recirculating a slurry of the material through the element until a clear recycle stream was produced, indicating that all of the precoat material was deposited on the filter. With the amount of material employed, this procedure produced a uniform precoat having a depth of about ¼ inch.

EXAMPLE I 17.7 grams of cellulose fibers, having an average length of 96 microns and an average diameter of 17 microns, were suspended in about 500 ml. of demineralized water in a tank equipped with a mechanical stirrer. 5.3 ml. of a 10% solution of cationic polyelectrolyte was added, and stirring was continued for ten minutes. The cationic polyelectrolyte employed was a commercially available polyamide having a molecular weight in the range of 20,000 to 100,000. This polyelectrolyte is available commercially under the trade name "Betz 1175," sold by the Betz Company, Trevose, Pennsylvania.

After ten minutes of stirring, 17.7 grams finely divided activated carbon, having an average particle diameter of less than 20 microns, was added. Stirring was continued for 10 minutes, and the final slurry was precoated onto the filter element described above. The amount of precoat material resulted in a coverage of 0.2 lb./ft.$^2$ In order to test the ability of the activated carbon/fiber precoat to absorb chlorine from aqueous solution, 25 ml. of a 5% solution of sodium hypochlorite (NaOCl) was added to 25 liters demineralized water in a feed tank. The tank was pressurized to 40 psig using purified nitrogen. This solution was metered into the influent line and through the filter at a flow rate of approximately 50 ml./min., resulting in a chlorine feed concentration of 1 ppm.±10%. The flow rate through the filter bed was 2.0 gpm/ft.$^2$ Free chlorine in the effluent stream was determined using a test kit which relies on the reaction of free chlorine with N,N-diethyl-p-phenylenediamine to produce a rose color. The results are shown in the following table:

TABLE 1

| Time (hr) | Effluent Conc./Influent Conc. |
| --- | --- |
| 1 | <0.1 |
| 2.5 | <0.1 |
| 7 | <0.1 |
| 12.5 | <0.1 |
| 19 | 0.05 |
| 23.5 | 0.2 |
| 30 | 0.3 |
| 36 | 0.4 |

EXAMPLE II

Example I was repeated except that the amount of precoat material was doubled to produce a coverage of 0.4 lb./ft.$^2$ on the filter element. The results are shown below in Table 2.

TABLE 2

| Time (hr.) | Effluent Conc./Influent Conc. |
| --- | --- |
| 1.0 | <0.1 |
| 6.5 | <0.1 |
| 10.5 | <0.1 |
| 19.0 | <0.1 |
| 26.0 | <0.1 |
| 36.0 | <0.1 |
| 43 | <0.1 |
| 50 | <0.1 |
| 55 | <0.1 |
| 69 | 0.05 |
| 70 | 0.075 |
| 71 | 0.1 |

As the data of Tables 1 and 2 demonstrate, the method and filter material of the present invention are highly effective in removing chlorine from aqueous solution. Moreover, the run length was more than doubled by doubling the amount of the filter bed on the element.

EXAMPLE III

In the following example, a filter material prepared in accordance with the present invention was evaluated for the removal of an organic contaminant, o-chlorophenol, from aqueous solution.

17.7 grams of the same cellulose fibers employed in the previous examples was suspended in 500 ml. demineralized water and 2 ml. of a 1% solution of a cationic polyelectrolyte was added. This polyelectrolyte was a commercially available polyamine having a molecular weight in excess of one million. It is marketed by Rohm and Haas under the trade name "Primafloc C-7." Stirring was continued for 15 minutes, and the material was then dewatered on a Buchner funnel using a Whatman No. 451 filter paper. The dewatered slurry was rinsed with 500 ml. demineralized water and resuspended in 450 ml. demineralized water. 17.7 grams of the same activated carbon used in the preceding examples was added, and stirring was continued for 10 minutes. The precoat was coated onto a filter cartridge in an amount sufficient to give a depth of ¼ inch and a loading of 0.2 lb./ft.$^2$ An aqueous solution of o-chlorophenol having a concentration of approximately 1 ppm. was fed through the filter element at varying flow rates. The effluent was analyzed for o-chlorophenol using ASTM method AD 1783-70. The following results were obtained.

TABLE 3

| (flow rate of 2 gpm/ft.$^2$) | |
| --- | --- |
| Time (hrs.) | Effluent Concentration |
| 0.25 | 0.0027 |
| 0.75 | 0.005 |
| 1.5 | 0.003 |
| 2.0 | 0.002 |
| 2.5 | 0.006 |
| 3.25 | 0.004 |
| 3.75 | 0.0032 |
| 4.5 | 0.0067 |
| 5.0 | 0.005 |
| 5.3 | 0.0205 |
| 5.5 | 0.0325 |

TABLE 4

| (flow rate of 4 gpm/ft.$^2$) | |
| --- | --- |
| Time (hrs.) | Effluent Concentration |
| 0.5 | 0.00 |
| 1.0 | 0.00 |
| 1.5 | 0.003 |
| 2.0 | 0.0098 |
| 2.5 | 0.038 |
| 3.0 | 0.085 |

TABLE 5

| (flow rate of 6 gpm/ft.$^2$) | |
| --- | --- |
| Time (hrs.) | Effluent Concentration |
| 0.33 | 0.002 |
| 0.5 | 0.00 |
| 0.67 | 0.003 |
| 0.83 | 0.003 |
| 1.0 | 0.0065 |
| 1.2 | 0.008 |
| 1.3 | 0.0095 |
| 1.7 | 0.035 |

As can be seen, the method of the present invention was highly effective in removing o-chlorophenol from aqueous solution.

EXAMPLE IV

The following example was conducted to demonstrate the particulate filtration ability, or "crud capacity," of the method and filter bed of the present invention. A filter material was prepared and precoated onto a filter element as in Example III. In this instance, a 1 ppm. suspension of $Fe_2O_3$ was fed through the filter element at a flow rate of 4.0 gpm/ft.$^2$, and effluent $Fe_2O_3$ concentration was measured periodically using a millipore filter. The results are shown below in Table 6.

TABLE 6

| Crud Loading (lb. Fe$_2$O$_3$/lb. Precoat) | Pressure Drop (psi) |
| --- | --- |
| 0 | ~1.0 |
| 0.08 | ~1.0 |
| 0.15 | 2.0 |
| 0.19 | 5.0 |
| 0.23 | 7.0 |

TABLE 6-continued

| Crud Loading (lb. Fe$_2$O$_3$/lb. Precoat) | Pressure Drop (psi) |
| --- | --- |
| 0.25 | 12.0 |
| 0.27 | 20.0 |
| 0.28 | 25.0 |

It can be seen that filter beds prepared in accordance with the present invention exhibit an excellent ability to remove suspended materials from aqueous suspension at low pressure-drop levels. This is particularly significant in the case of $Fe_2O_3$, which is an especially difficult material to remove from aqueous suspension.

EXAMPLE V

In order to obtain a comparison with activated carbon alone, an attempt was made to precoat a filter element with activated carbon in order to determine the filtration characteristics of this material. 35.4 g. activated carbon were suspended in 7.1 demineralized water using a mechanical stirrer as before. However, when an attempt was made to precoat this material onto the filer element, the pressure drop rose rapidly to a level in excess of 20 psi. It was estimated that less than half of the activated carbon had been precoated onto the filter element at this point. At this high pressure drop level, any filtration test would have exceeded the capacity of the pump, and the filter element could be considered to be effectively completely blocked. This experiment thus demonstrated that activated carbon alone cannot be used in accordance with the present invention.

EXAMPLE VI

In order to demonstrate the feasibility of the method and filter bed of the present invention with other active particulate materials and other fibrous filter aid materials, the following experiments were conducted. In each instance, 26.6 g. of the fibrous filter aid material was suspended in 500 ml. demineralized water, and 8.0 ml. of a 10% solution of the same cationic organic polyelectrolyte used in the preceeding examples was added. Stirring was continued for ten minutes, the slurry was allowed to settle for 15 minutes, and the supernate was decanted. 8.8 g. of the active particulate material was added and the suspension was stirred for another 5 minutes. For comparison purposes, the identical test was repeated in each instance, except that the fibrous filter aid material was not treated with an organic polyelectrolyte.

Through a vast amount of experience with commercial processes, it is known that the ability of the mixture to form a filter bed which gives a desirably low pressure drop together with efficient "in-depth" filtration may be determined by making a volume measurement referred to as "V/V$_{15}$." This measurement is made by transferring a slurry having a 7% solids concentration, by weight, to a 500 ml. graduate and allowing the material to settle for 15 minutes. The ratio of settled floc to total volume (500 ml.) is reported as V/V$_{15}$. The turbidity of the supernatant also provides a measure of the efficiency of "clumping" in that, when agglomeration occurs, fines will be removed from the supernate. Thus, the lower the supernatant turbidity, the better the filter that is formed. The turbidity measurements set forth in the following table were made by withdrawing a 50 ml. sample from the supernatant and measuring it on a Hach turbidimeter Model 1720. In cases where it was impossible to remove a 50 ml. sample, the turbidity was estimated by comparison with a set of turbidity standards supplied by the Hach Manufacturing Company. The results are shown below in Table 7.

TABLE 7

| FIBROUS FILTER AID | ACTIVE PARTICULATE MATERIAL | V/V$_{15}$ Treated | V/V$_{15}$ Untreated | TURBIDITY (NTU*) Treated | TURBIDITY (NTU*) Untreated |
|---|---|---|---|---|---|
| Cellulose | Bentonite | 95 | 15 | ~100 | >1000 |
| Cellulose | Kaolin | 43 | 8 | ~10 | >1000 |
| Cellulose | Zirconium Phosphate | 47 | 9 | ~10 | >1000 |
| Polypropylene | Zirconium Phosphate | — | — | ~10 | >1000 |
| Nylon | Zirconium Phosphate | — | — | ~10 | >1000 |

*Nephelometric turbidity units.

As all of the foregoing data demonstrate, satisfactory precoats could be formed from any of the combinations set forth above where the fibrous filter aid was treated with a cationic polyelectrolyte. In contrast the mixture prepared with untreated fibrous filter aid would not form a satisfactory precoat.

EXAMPLE VII

Example VI was repeated, except that, in this instance, the active particulate material employed was alumina, which has a positive surface charge in aqueous suspension. It was therefore necessary to provide a "double treatment" to the fibrous filter aid material, which has a negative surface charge in aqueous suspension. In order to accomplish this double treatment, after the addition of cationic polyelectrolyte as in the foregoing example, and after the cellulose slurry was allowed to mix for ten minutes, 8.0 ml. of a 10% solution of polyacrylic acid having a molecular weight in the range of 150,000–300,000 was added, and mixing was continued for ten minutes more. At the completion of mixing, the slurry was allowed to settle for 15 minutes and the supernatant was decanted as in the previous example. 8.8 g. powdered activated alumina, having a particle size of less than 10 microns was added. The data are shown below in Table 8.

TABLE 8

| Fibrous Filter Aid | Active Particulate Material | V/V$_{15}$ Treated | V/V$_{15}$ Untreated | Turbidity (NTU) Treated | Turbidity (NTU) Untreated |
|---|---|---|---|---|---|
| Cellulose | Alumina | 22 | 10 | ~100 | >1000 |

Again, the foregoing data demonstrate that a satisfactory precoat material could be prepared from this combination when the fibrous filter aid material is first treated in accordance with the present invention. Thus, filtration could be achieved while the desired absorptive properties of activated alumina would be realized.

Obviously, many modifications and variations of the invention as hereinbefore set forth will occur to those skilled in the art, and it is intended to cover in the appended claims all such modifications and variations as fall within the true spirit and scope of the inention.

I claim:

1. A method for removing impurities from a liquid comprising: passing said liquid through a filter bed comprising a mixture of treated fibrous filter aid material and an active particulate material, said treated filter aid material and said particulate material having opposite surface charges in aqueous suspension, and said mixture producing a clumping phenomenon, wherein said filter aid material comprises about 5 to 95% by weight, of said bed, and wherein said filter aid material has been treated with an electrolyte-type compound that produces a surface charge opposite to the normal surface charge by bonding to the surface of said filter aid material.

2. The method as defined in claim 1 wherein said active particulate material is selected from the group consisting of organic polymeric absorbants, zeolites, bentonite, zirconium oxide, zirconium phosphate, activated alumina, ferrous sulfide, activated carbon, and diatomaceous earth.

3. The method as defined in claim 2 wherein said filter aid material is selected from the group consisting of cellulose fibers, polyacrylonitrile fibers, Teflon fibers, nylon fibers, rayon fibers, polypropylene fibers, and polyvinyl chloride fibers.

4. The method as defined in claim 3 wherein the fibers of said filter aid material have an average length of from about 10 to 1000 microns.

5. The method as defined in claim 1 wherein said active particulate material is activated carbon.

6. The method as defined in claim 1 wherein said filter aid material has been further treated with a second electrolyte-type compound to produce an enhanced surface charge which is the same as said normal surface charge by bonding to said treated filter aid material.

7. The method as defined in claim 6 wherein said filter aid material normally has a negative charge in aqueous suspension.

8. The method as defined in claim 7 wherein said cellulose fibers comprise about 25 to 60%, by weight, of said bed.

9. The method as defined in claim 6 wherein said electrolyte-type compound is a cationic organic polyelectrolyte.

10. A method for removing impurities from a liquid comprising: passing said liquid through a filter bed comprising a mixture of treated cellulose fibers and activated carbon particles, said carbon particles having a negative surface charge, and said mixture producing a clumping phenomenon, wherein said cellulose fibers comprise about 5 to 95%, by weight, of said bed, and wherein said cellulose fibers have been treated with an electrolyte-type compound that produces a positive surface charge by bonding to the surface of said fibers.

11. An improved filter bed comprising a mixture of treated fibrous filter aid material and an active particulate material, said treated filter aid material and said particulate material having opposite surface charges in aqueous suspension, and said mixture producing a clumping phenomenon, wherein said filter aid material comprises about 5 to 95% by weight, of said bed, and wherein said filter aid material has been treated with an electrolyte-type compound that produces a surface charge opposite to the normal surface chharge by bonding to the surface of said filter aid material.

12. The filter bed as defined in claim 11 wherein said active particulate material is selected from the group consisting of organic polymeric absorbants, zeolites, bentonite, zirconium oxide, zirconium phosphate, activated alumina, ferrous sulfide, activated carbon, and diatomaceous earth.

13. The filter bed as defined in claim 12 wherein said filter aid material is selected from the group consisting of cellulose fibers, polyacrylonitrile fibers, Teflon fibers, nylon fibers, rayon fibers, polypropylene fibers, and polyvinyl chloride fibers.

14. The filter bed as defined in claim 13 wherein said fibers have an average length of about 10 to 1000 microns.

15. The filter bed as defined in claim 11 wherein siad active particulate material is activated carbon.

16. The filter bed as defined in claim 11 wherein said filter aid material has been further treated with a second electrolyte-type compound to produce an enhanced surface charge which is the same as said normal surface charge by bonding to said treated filter aid material.

17. A filter bed as defined in claim 16 wherein said filter aid material normally has a negative charge in aqueous suspension.

18. An improved filter bed comprising: a mixture of treated cellulose fibers and activated carbon particles, said carbon particles having a negative surface charge, and said mixture producing a clumping phenomenon, wherein said cellulose fibers comprise about 5 to 95%, by weight, of said bed, and wherein said cellulose fibers have been treated with an electrolyte-type compound that produces a positive surface charge by bonding to the surface of said cellulose fibers.

19. The filter bed as defined in claim 18 wherein said electrolyte-type compound is a cationic organic polyelectrolyte.

20. The filter bed as defined in claim 19 wherein said cellulose fibers comprise about 25% to 60%, by weight, of said bed.

* * * * *

UNITED STATES PATENT AND TRADEMARK OFFICE
CERTIFICATE OF CORRECTION

PATENT NO. : 4,238,334

DATED : December 9, 1980

INVENTOR(S) : Christopher J. Halbfoster

It is certified that error appears in the above—identified patent and that said Letters Patent is hereby corrected as shown below:

Column 8, line 21, delete "7.1" and insert therefor --7 1.--.

Column 9, line 59, delete "inention" and insert therefor --invention--.

Column 9, line 68, insert --,-- immediately after "95%".

Column 10, line 31, insert -- about -- after "to".

Column 10, line 64, insert --,-- immediately after "95%".

Column 10, line 67, delete "chharge" and insert therefor --charge--.

Column 11, line 17, delete "siad" and insert therefor --said--.

Signed and Sealed this

Twenty-ninth Day of September 1981

[SEAL]

Attest:

Attesting Officer

GERALD J. MOSSINGHOFF

Commissioner of Patents and Trademarks